United States Patent
Smith et al.

[11] Patent Number: 5,918,286
[45] Date of Patent: Jun. 29, 1999

[54] APPARATUS FOR TORQUE MEASUREMENT ON ROTATING SHAFTS

[76] Inventors: Frantz Karsten Smith, Søvikhaugen 17, N-5060, Søreidgrend; Marvin Sigmund Storesund, Friggs vei 20, N-5050, Nesttun, both of Norway

[21] Appl. No.: 08/809,648

[22] PCT Filed: Sep. 21, 1995

[86] PCT No.: PCT/NO95/00170

§ 371 Date: Mar. 26, 1997

§ 102(e) Date: Mar. 26, 1997

[87] PCT Pub. No.: WO96/10167

PCT Pub. Date: Apr. 4, 1996

[30] Foreign Application Priority Data

Sep. 26, 1994 [NO] Norway ........................................ 943559

[51] Int. Cl.$^6$ ........................................ G01L 3/02
[52] U.S. Cl. ........................................ 73/862.324
[58] Field of Search ........................ 73/862.324, 862.328, 73/862.325, 862.326, 800

[56] References Cited

U.S. PATENT DOCUMENTS

| | | | |
|---|---|---|---|
| 3,888,116 | 6/1975 | Spinella | 235/151.3 |
| 3,938,890 | 2/1976 | Flavell | 356/119 |
| 4,520,681 | 6/1985 | Moore et al. | 73/862.2 |
| 4,637,264 | 1/1987 | Takahashi et al. | 73/862.3 |
| 4,693,123 | 9/1987 | Bacardit | 73/862.3 |
| 4,953,411 | 9/1990 | Coenen et al. | 73/862.3 |
| 5,374,821 | 12/1994 | Muhs et al. | 73/800 X |
| 5,490,430 | 2/1996 | Anderson et al. | 73/862.324 |

FOREIGN PATENT DOCUMENTS

| | | |
|---|---|---|
| 1148777 | 6/1963 | Germany . |
| 2151775 | 7/1985 | United Kingdom . |
| WO92/15001 | 9/1992 | WIPO . |

OTHER PUBLICATIONS

Antriebstechnick, 33 (1994) No. 8, "Entwicklung eines robusten beruhrungslosen . . . ", pp. 53–57.

*Primary Examiner*—Harshad Patel
*Attorney, Agent, or Firm*—Jacobson, Price, Holman & Stern, PLLC

[57] ABSTRACT

Apparatus intended for measuring the torque of rotating shafts for the purpose of calculating the shaft power without using sensors mounted or glued to the shaft. The long time accuracy is increased by using only one single optical electronic sensor in the pulse receiver. Alteration of sensor data due to temperature variations and aging do not affect the accuracy. The light is transmitted from the source/transmitter through optical fibre. The light beam is pulsed in two air gaps by coding discs/gearwheels mounted to the shaft at a convenient distance from each other (16 and 21). The light is transmitted by optical fibres (24a, 24b) from the source/transmitter (45) and via the optical U-shaped elements (39, 40) where the light beams are pulsed and added in the light collector (32). The time displacement between the vanes/teeth on the two discs/gearwheels is a measure on the shaft torque, enabling the shaft power to be calculated in the computer (50). To increase the accuracy in case of shaft vibrations, the width modulated pulses are accumulated and averaged at convenient numbers of shaft turns. The accuracy is increased by detecting both rising and falling pulse edges in order to double the number of pulses each shaft turn.

16 Claims, 5 Drawing Sheets

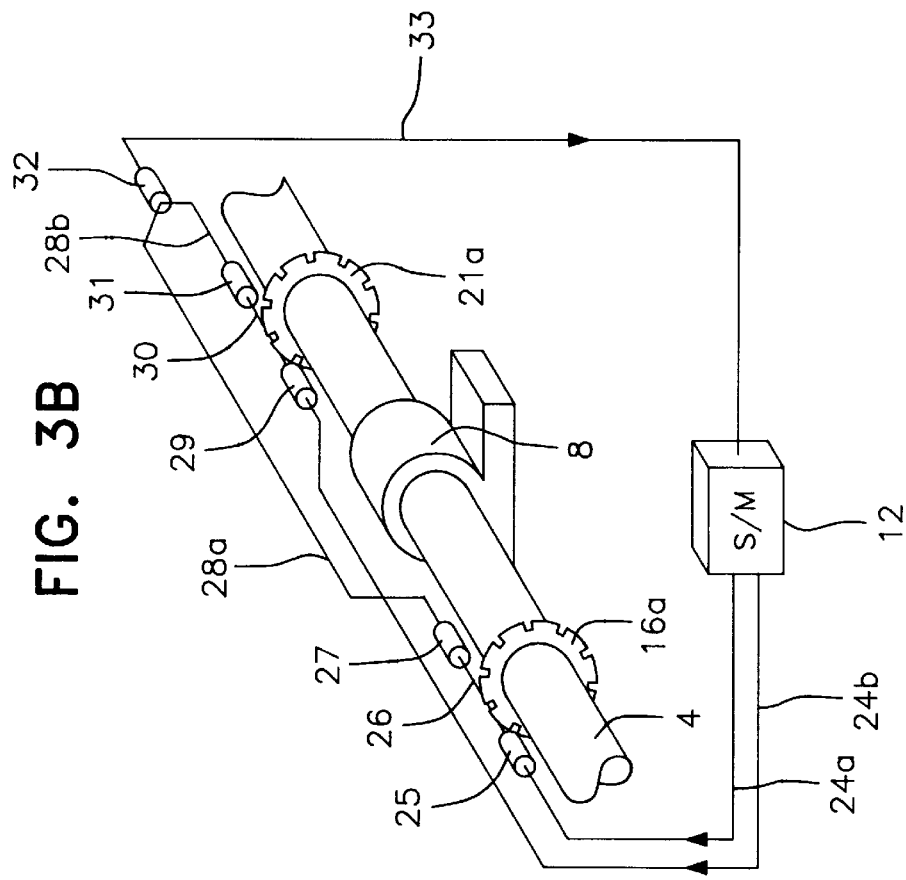
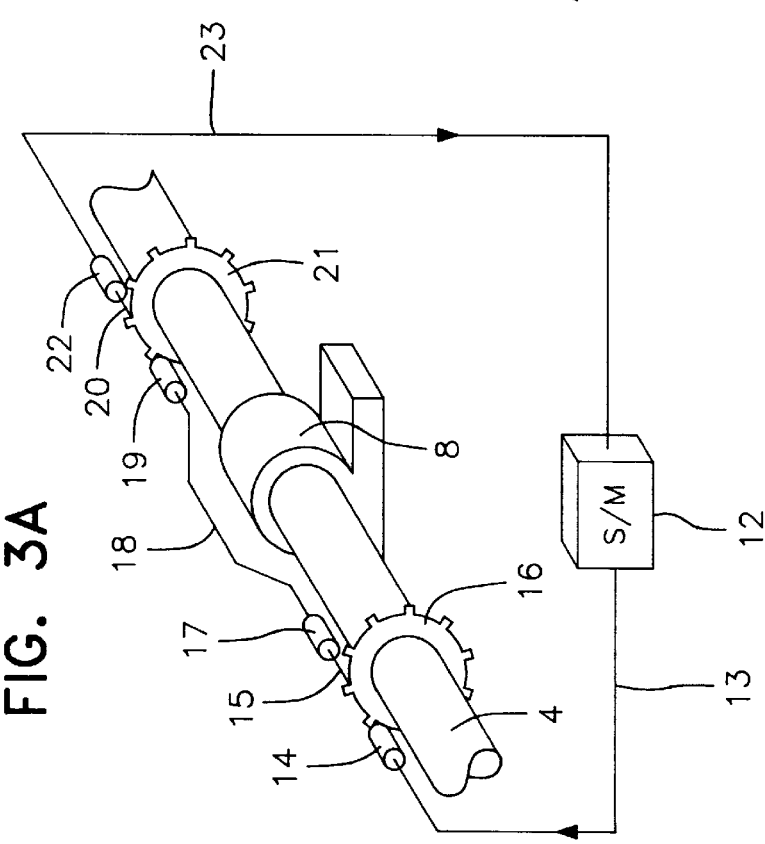

APPARATUS FOR TORQUE MEASUREMENT ON ROTATING SHAFTS

BACKGROUND OF THE INVENTION

1. Field of the Invention

This invention describes a new apparatus and method for measuring the angle of torsion on loaded rotating shafts. When the angle is known, it is possible to calculate the torque and the power as the RPM also will be known or measured.

2. Description of the Related Art

The most used method for measuring the power on rotating shafts used in various types of machinery has until now been done by the use of strain gauges glued to the shaft. The signals measured by the strain gauges have been transferred to the instrument electronics and the display by means of sliprings or telemetri. When telemetri is used, it is necessary to have a transmitter mounted on the rotating shaft and powered by a rotating battery, or in newer systems, wireless transfer of power to the strain gauge electronics on the shaft.

A later system uses so-called magnetic hall effect sensors. The sensors pick up signals by means of two gear wheels which are placed on the shaft in an adequate distance from each other. When the shaft is loaded there will be a time delay between the pulses detected by the two hall effect sensors, each of which is sensing on a gear wheel. The time delay between the pulses determine the torsional angle of the loaded shaft. A similar system to this is described in the publication "Antriebstechnik" 33 (1994) No. 8 page 53: "Entwicklung eines robusten berührongslosen Drehzahl-Drehmoment-Messystems."

U.S. Pat. No. 4,520,681 is a system which uses a pulse train principle with rotating coders in an adequate internal distance from each other and mounted to the shaft. The torsional angle is measured by means of the time delay between electronic pulses. Two sensors are mounted in an adequate distance from each other, one sensor at each rotating coder. The same time delay between the pulses from the said sensors is measured in electronic counting circuits. In U.S. Pat. No. 4,520,681 either optical or magnetic sensors are used. This system uses similar or identical principles to the system as described at page 53 in the publication "Antriebstechnik" 33 (1994) No. 8.

The above-mentioned systems have the common principle of operation that they will have to use two electronic sensors to make it possible to detect the torsional angle of a loaded shaft.

SUMMARY OF THE INVENTION

To achieve a sufficient accuracy in systems using two sensors placed at a distance from each other, it is necessary that the trigger points of the sensors do not drift from each other. Aging and/or temperature variations may cause the trigger points to drift from each other and possibly in opposite directions.

The invention described herein uses only one single sensor system to measure the torsional angle of a rotating loaded shaft. This eliminates that the measured time delay between the sensed pulses can drift and thus causing inaccuracies to occur. This invention presents itself as a new system which has a high degree of accuracy and longtime stability.

BRIEF DESCRIPTION OF THE DRAWINGS

FIGS. 3A and 3B essentially show the apparatus of FIG. 2, with the light being interrupted by discs. FIG. 3B shows the apparatus having the light beam split in two parallel paths.

DETAILED DESCRIPTION OF PREFERRED EMBODIMENTS

Figure 1:
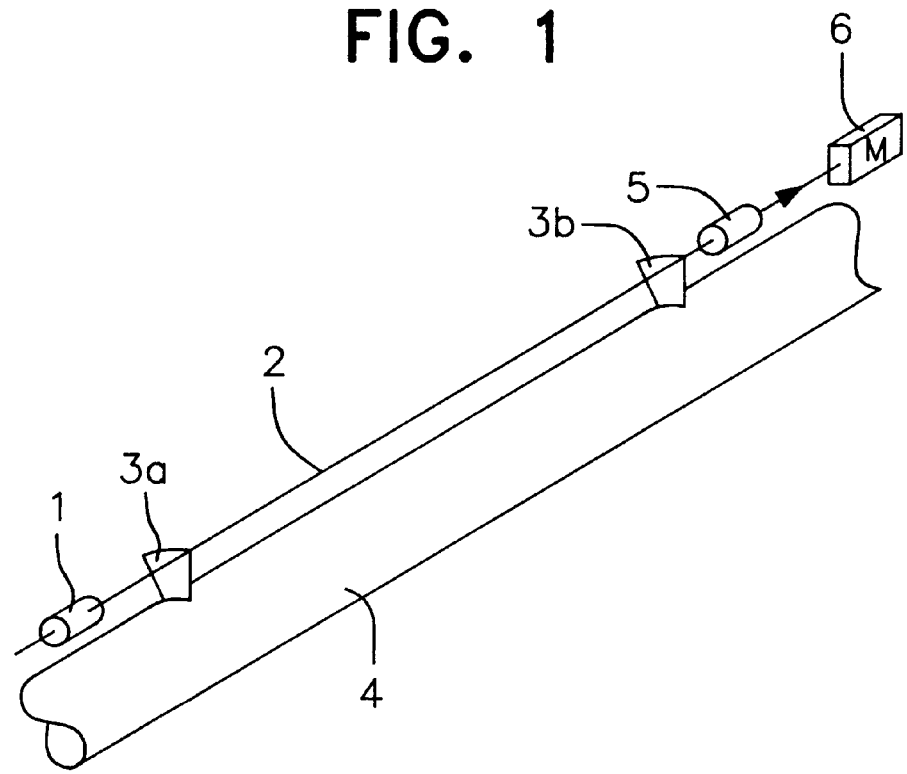
FIG. 1 is a perspective drawing of the system shown in accordance with the preferred embodiment of the invention having a single light source transmitter and receiver.

FIG. 1 shows the apparatus with one light source as the transmitter and a light sensitive electronic sensor as receiver. The light source, functioning as the transmitter, may be a LASER source or a LED (Light Emitting Diode). From the transmitter (1) there is a narrow light beam (2) radiated parallel to the rotating shaft (4).

During the shaft rotation the light beam will be interrupted by the vanes (3a) and (3b), which are mounted to the shaft at an adequate distance from each other. The light pulses generated in this way are received by the receiver (5). The light sensitive electronics (6) generate the electronic pulses. When the shaft is loaded, the vanes (3a) and (3b) will be displaced an angle equivalent to the torsional angle.

Figure 4:
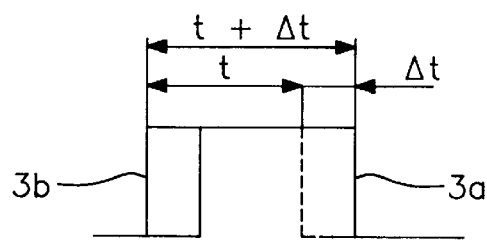
FIGS. 4 and 5 are illustrations of light pulses after having passed through the various vane and discs shown in the previous figures.

The light/dark time increases from the time t unloaded until t+ Δt loaded. This principal is illustrated on FIG. 4 showing the vanes (3a) and (3b) mounted to the shaft and displaced a time Δt to each other.

Figure 2:
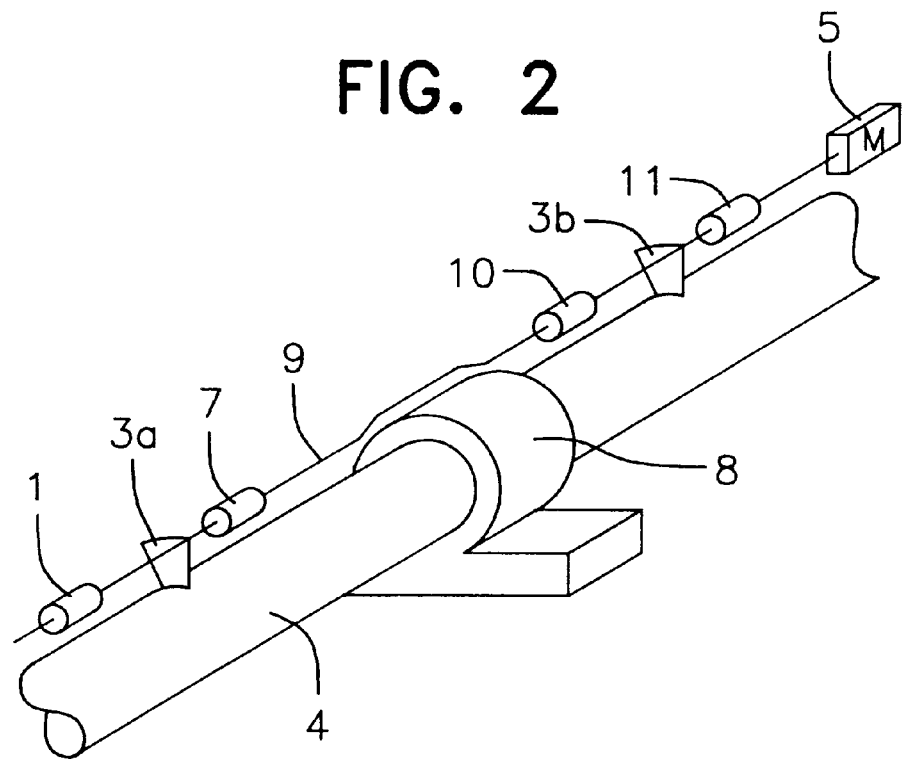
FIG. 2 shows the apparatus of FIG. 1, with an additional receiver, fiber optic cable, and transmitter interposed between the light source transmitter and receiver of FIG. 1.

FIG. 2 shows an example using fibre optic cable (9). The beam from said cable is interrupted at the vanes (3a) and (3b). The light beam is transmitted from the source (1) crossing the space at (3a) and is further picked up by the optical received (7), transmitted through the fibre optic cable (9), the optical lens (10) and across another space at (3b) to the optical receiver (11) which is connected to the light sensitive receiver (6) with internal pulse-generating electronic circuits. By using fibre optic cable for the light transmission, obstructions like bearings (8) etc. FIG. 2 can be passed. This makes it possible to enlarge the distance between the interrupting vanes and to increase the accuracy of the measurement.

FIG. 3A shows an arrangement with two coding discs or gearwheels used for light beam modulation. As shown in FIG. 3A, the light beam is transmitted from a source (12), indicated by S/M, through the fibre cable (13) to the optical transmitter/lens (14). After the light beam (15) has passed the rotating pulse modulating disc (16), it is received by the optical receiver (17), which in turn transmits the pulse-modulated light beam through the connected optical fibre (18) and further through the lens (19). The light beam (20) passes through the rotating disc (21) and is received by the optical receiver (22) from which it is retransmitted through the optical fibre (23) to a light sensitive sensor (12) indicated as S/M. In this way, the light beam is pulsed into a great number of pulses each turn of the shaft. The displacement between the teeth of the two coding discs (16) and (21) determines the pulse width which is a measure on the torsional angle, the torque and the shaft power.

FIG. 3B shows the complementary arrangement of FIG. 3A. In FIG. 3A is the light beam (15), (20) transmitted through the fibre arranged in a serial configuration as it will have to pass the two spaces at (16) and (21). In the arrangement shown in FIG. 3B the light beam transmitted from the source (12) is split in two parallel beams. The light which is transmitted through the fibre (24a) passes the gap (26) and the disc (16a). A second similar light beam passes the gap (30) and the disc (21a). Both light beams (26) and (30) are pulsed by the discs (16a) and (21a) respectively. The discs (16a) and (21a) are inverted compared to the discs (16) and (21) FIG. 3A. The discs (16a) and (21a) are identical and have narrow light openings and wider vanes. An adequate relation between openings and vanes is 1:4. The pulse modulated light is transmitted through the fibres (28a) and (28b). The two pulsed light beams are added in the optical summing unit (32). The resulting output from (32) will be a pulse width modulated light beam, which in turn is transmitted to the light sensitive electronic receiver (12) named S/M on FIG. 3B.

Both the arrangements as shown in the FIG. 3A and 3B will in principle give identical information to the light sensitive receiver and detector in (12). The arrangement of FIG. 3B is preferred because of the lower damping of the light, compared to the arrangement in FIG. 3A. The light beam is split in two parallel paths, such that each beam will have only one space of air to pass. In addition, it is preferable to use narrow light openings and wider vanes, as shown in FIG. 3B, to avoid an offset signal in the light pulses out of the adder (33), after the summation of the pulses from (28a) and (28b).

Figure 5:
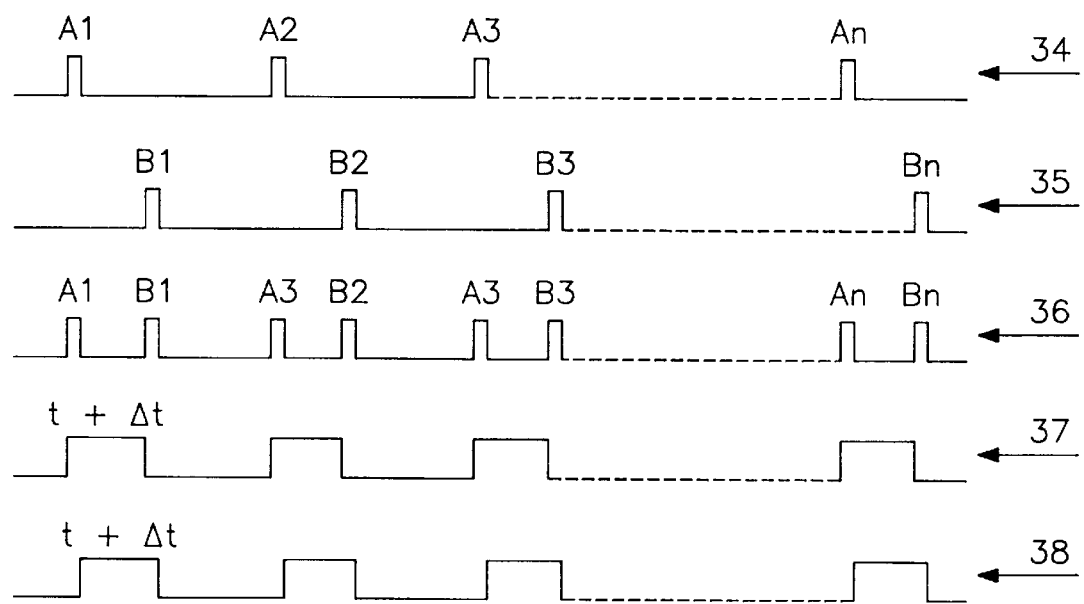

In FIG. 5, elements (34) and (35) illustrate the light pulses after having passed the disc vanes indicated as A1 ... An and B1 ... Bn on the two discs FIG. 3A (16) and (21). As will be seen from FIG. 3B, the discs/gearwheels (16a) and (21a) are the inverted mode of (16) and (21).

Both discs/gearwheels attached to the same shaft are congruent and spaced an adequate distance from each other.

The mutual position of the discs/gearwheels (16) and (21) are uncritical with an unloaded shaft. They are normally mounted in a position with B1 ... Bn falling in between A1 ... An and in a way that overlapping is avoided during loading of the shaft. This situation is illustrated in FIG. 5 (34) and (35). When the shaft rotates, the light sensitive sensor (12) will receive light pulses as shown in FIG. 5 (36). If the shaft is unloaded, there will be a time displacement t between the teeth A and B of the two discs/gearwheels. When loaded, this time displacement will increased to t+$\Delta$t, where $\Delta$t expresses the rate of loading.

The light signals received by the light sensitive sensor/receiver (12) FIG. 3A or FIG. 3B generate width modulated electronic pulses. The pulse width modulation are generated by measuring the time between the raising pulse edges and similarly also the time between the falling pulse edges.

FIG. 5 (37) illustrates pulses generated by the raising edges of A and B. FIG. 5 (38) illustrates similarly the falling edge pulses. This mode of pulse generation doubles the number of pulses each turn of the shaft and will be exactly twice the number of teeth on the discs/gearwheels.

Both series of width modulated pulses (37) and (38) are accumulated in the fast electronic registers.

The sum of the time duration is averaged and updated at suitable number of turns of the shaft or time intervals.

When the offset time t, which is the time displacement unloaded, is zeroed, the displacement time $\Delta$t is calculated by averaging the accumulated content in the registers after suitable time intervals. The updating of the time $\Delta$t can be done to selectable intervals.

Calculation of the RPM is carried out by counting the clock pulses of one turn of the shaft. As a rather high clock frequency is used to drive the counters, the measurement of the RPM has a high degree of resolution and accuracy.

The averaged time displacement $\Delta$t, the measured RPM and the knowledge of the steel parameters of the shaft make it possible to calculate the torque and the shaft power.

Figure 6:
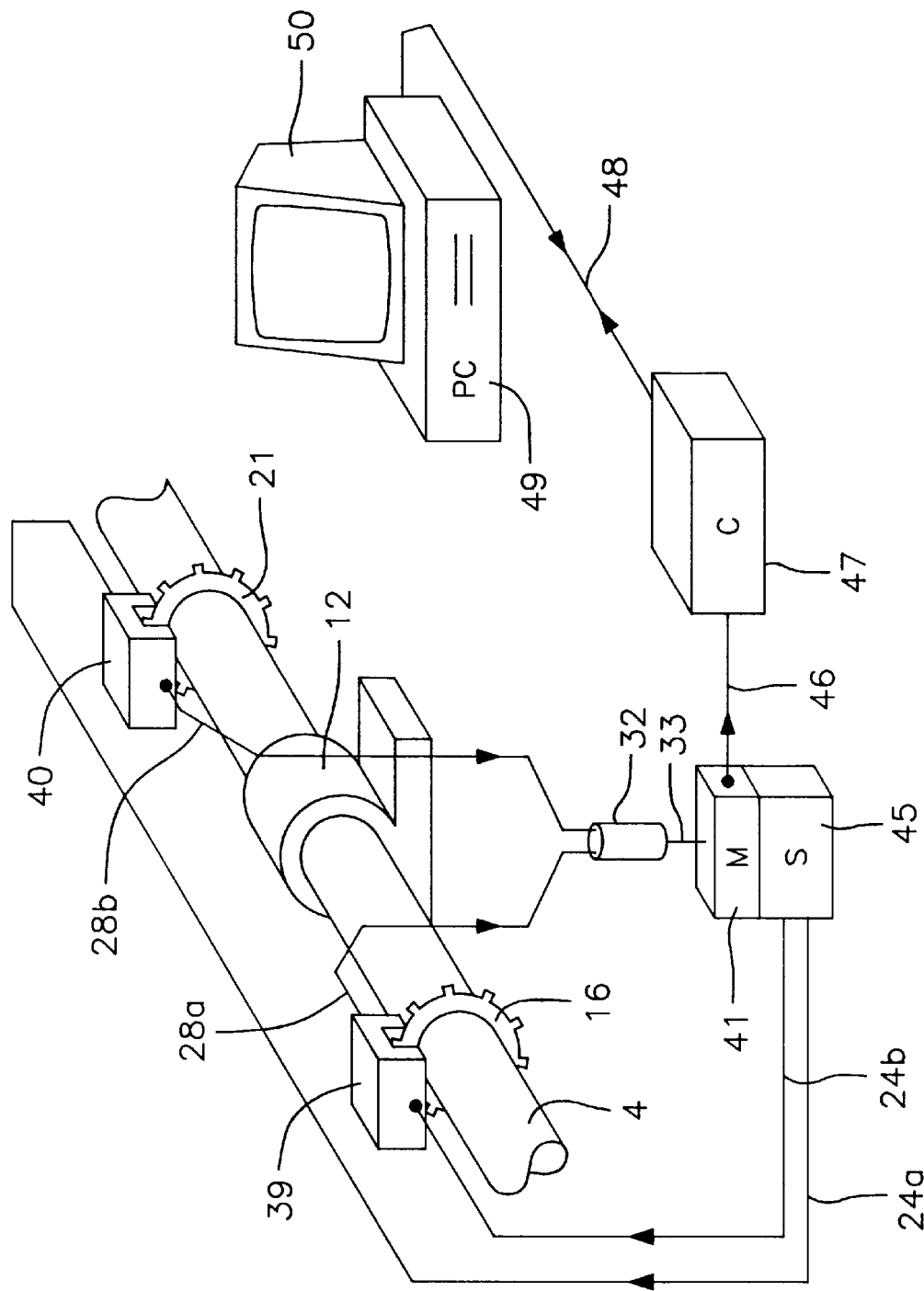
FIG. 6 shows an implementation of the invention in an overall system.
Figure 7A:
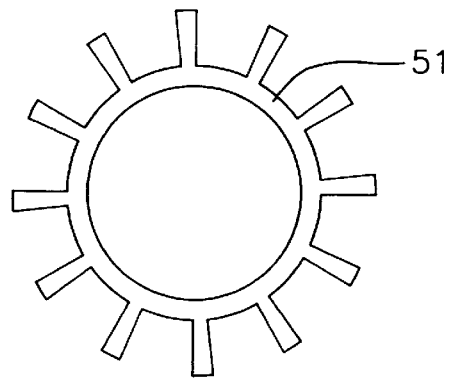
FIG. 7 is illustrative examples of discs used in the systems of FIGS. 3A, 3B and 6, and the respective pulses that are generated.
Figure 7B:
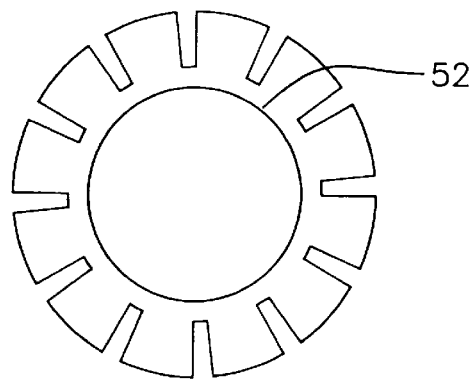
Figure 7C:
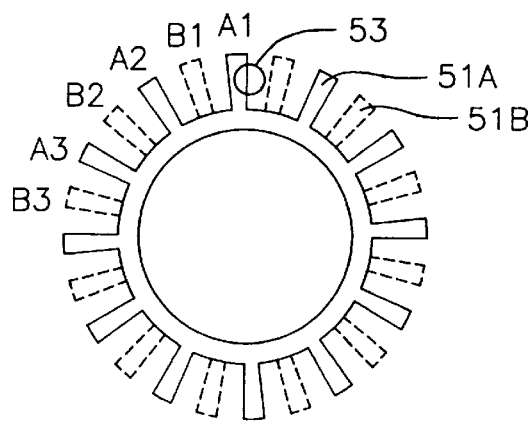
Figure 7D:
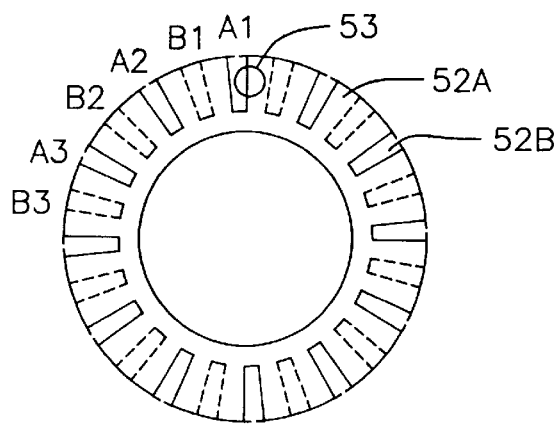
Figure 7E:
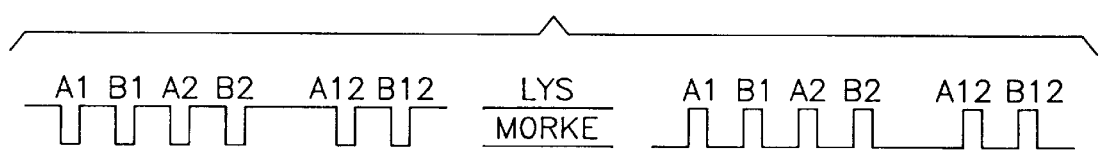

A practical arrangement of this invention can be carried out as illustrated in FIG. 6. The light is transmitted from the source S (45) through the split fibres (24a) and (24b). The two beams pass through the U formed spacings (39) and (40). The airgaps in the spacings are in the order of 5–10 mms. Similar to the arrangement as shown in FIGS. 3A and 3B the said light beam is pulsed by the rotating discs which are supplied with suitable teeth/vanes passing the gap in the U-shaped sensors.

After having passed the two air spacings (39), (40), the pulsed light beams are collected in the light adding element (32). The sum of the beams are transmitted through the fibre (33) to the light sensitive receiver (41). The shape of the light pulses are illustrated in FIG. 5 (36). The receiver is a light sensitive detector with a very short fast response. The electronic output pulses from the detector are signals at TTL level. These real time signals are processed in the extremely fast PLD counting circuits (47) in which the information is preliminarily stored and used for the averaging and updating of the measured torsional angle. This process is controlled via a duplex RS485 communication line by a standard PC (49).

To eliminate inaccuracies caused by periodic movements like vibrations etc., the signals expressing the torsional angle are summed and averaged after a selected number of turns of the shaft.

The data measured and calculated in the way described above are sufficient for an accurate calculation of RPM, torque and power.

RPM, torque and power are presented both graphically and digitally on the PC monitor (50) and/or on a LCD display.

The great advantage of this invention is its use of one light source and a single light sensitive electronic detector only. In the arrangements shown on FIG. 3B and FIG. 6, two independent light sources may be used to feed light into the optical fibres (24a) and (24b). The use of one or two light sources is a question of convenience. An outstanding feature of this invention is the use of optical fibres to feed light from the transmitters to the single light sensitive electronic receiver/detector. The said arrangement has the great advantage that the coding discs may be mounted to the shaft at the most convenient distance from each other.

As described above, the two sensing points, i.e., the two discs/gearwheels, can be mounted to the shaft at a great distance from each other by the use of fibre for the signal transmission to one signal detector only.

In this way more bearings and bulkheads can be bypassed and the distance between the sensing points, i.e., between the discs/gearwheels, can be made as great as possible in order to increase the accuracy. FIGS. 3A and 3B and FIG. 6 show a shaft arrangement with only one bearing (8) bypassed by the optical fibre.

In FIG. 7, elements (51) and (52) illustrate two different versions of the discs/gearwheels. The design (52) is an inverted version of (51). The version (51) senses the dark pulses. The version (52) senses the bright pulses. Principally, both methods can be used. The displayed series of light/dark pulses which hit the light sensitive detector after having passed the two disc/gearwheel coders (51A), (51B) or (52A), (52B) respectively, are indicated as A1, B1 . . . A12, B12. The number of vanes/teeth on the coding discs shown are 12 and as a result the pulse strain A1 . . . B12 corresponds to one turn of the shaft. The circle (53) indicates a possible place for mounting of the light source. As already described, the spacings between the pulses A1, B1, etc. express the torsion and accordingly the torque of the rotating shaft.

We claim:

1. An apparatus for measuring torque developed in rotating a shaft comprising:
    a first vane secured to the shaft at a first position corresponding to a first airgap;
    a second vane secured to the shaft at a second position corresponding to a second airgap, said second vane located a predetermined distance from said first vane;
    a first optical fibre transmitting light received from a light source;
    first optical light transmitter transmitting light received from said first optical fibre to the first airgap;
    first optical light receiver receiving light transmitted by said first optical light transmitter via the first airgap;
    a second optical fibre transmitting light received by said first optical light receiver;
    a third optical fibre transmitting light received from said light source;
    a second optical light transmitter transmitting light received from said third optical fibre to the second airgap;
    a second optical light receiver receiving light transmitted by said second optical light transmitter via the second airgap;
    a fourth optical fibre transmitting light received by said second optical light receiver;
    an adder combining light transmitted by said second and fourth optical fibres;
    a fifth optical fiber transmitting light combined by the adder; and
    a light sensitive sensor receiving light transmitted by the fifth optical fiber and processing the received light combined by said adder to determine the torque.

2. The apparatus according to claim 1, wherein the airgaps are implemented as two optical forks.

3. The apparatus according to claim 1, further comprising electronic pulse counter circuits to store information about the shaft torque, and further a computer for signal processing.

4. A method for measuring the torque developed in rotating a shaft, comprising:
    securing a first vane to the shaft at a first position corresponding to a first airgap;
    securing a second vane to the shaft at a second position corresponding to a second airgap, the second vane located a predetermined distance from the first vane;
    transmitting, through a first optical fibre, light received from a light source;
    transmitting, by a first optical light transmitter, light received from the first optical fibre to the first airgap;
    receiving, at a first optical light receiver, light transmitted by said first optical light transmitter via the first airgap;
    transmitting, through a second optical fibre, light received by said first optical light receiver;
    transmitting, through a third optical fibre, light received from said light source;
    transmitting, by a second optical light transmitter, light received from said third optical fibre to the second airgap;
    receiving, at a second optical light receiver, light transmitted by said second optical light transmitter via the second airgap;
    transmitting, through a fourth optical fibre, light received by said second optical light receiver;
    combining, with an adder, light transmitted by said second and fourth optical fibres;
    transmitting, through a fifth optical fibre, light combined by the adder; and
    receiving and processing, at a light sensitive sensor, light transmitted by the fifth optical fiber and combined by said adder to determine the torque.

5. The method according to claim 4, further comprising shaping the airgaps by optical forks and converting the light by the light sensitive sensor in to electronic pulses that are transmitted to electronic pulse counter circuits where the information is stored and subsequently transmitted via duplex communication to a computer that based on the received pulses calculates torque, angular velocity and the power developed in the shaft.

6. The method according to claim 4, further comprising using the light sensitive sensor for converting of light into electronic pulses representing time between both rising and falling edges of the pulses respectively, thereby allowing the accumulation of twice a number of time delays for a number of shaft turns.

7. The method according to claim 4, further comprising accumulating both the time between rising edges and time between falling edges for a predetermined number of shaft turns and then calculating a mean value of said time between the rising edges and the falling edges respectively to obtain an expression representing shaft torsion when angular velocity is known.

8. The method according to claim 4, wherein the first and second vanes have slits for passing light.

9. An apparatus for measuring the torque developed in rotating a shaft, comprising:
    a first vane secured to the shaft at a first position corresponding to a first airgap;
    a second vane secured to the shaft at a second position corresponding to a second airgap, said second vane located a predetermined distance from said first vane;
    a first optical fibre transmitting light received from a light source;
    a first optical light transmitter transmitting light received from said first optical fibre to the first airgap;
    a first optical light receiver receiving light transmitted by said first optical light transmitter via the first airgap;
    a second optical fibre transmitting light received by said first optical light receiver;
    a second optical light transmitter transmitting light received from said second optical fibre to the second airgap;
    a second optical light receiver receiving light transmitted by said second optical light transmitter via the second airgap;
    a third optical fibre transmitting light received by said second optical light receiver; and,
    a light sensitive sensor for processing light transmitted by said third optical fibre to determine the torque.

10. The apparatus according to claim 9, wherein the airgaps are implemented as two optical forks.

11. The apparatus according to claim 9, further comprising electronic pulse counter circuits to store information about the shaft torque, and further a computer for signal processing.

12. A method for measuring the torque developed in rotating a shaft, comprising:

securing a first vane to the shaft at a first position corresponding to a first airgap;

securing a second vane to the shaft at a second position corresponding to a second airgap, the second vane located a predetermined distance from the first vane;

transmitting, through a first optical fibre, light received from a light source;

transmitting, by a first optical light transmitter, light received from the first optical fibre to the first airgap;

receiving, at a first optical light receiver, light transmitted by said first optical light transmitter via the first airgap;

transmitting, through a second optical fibre, light received by said first optical light receiver;

transmitting, through a second optical light transmitter, light received from said second optical fibre to the second airgap;

receiving, at a second optical light receiver, light transmitted by said second optical light transmitter via the second airgap;

transmitting, through a third optical fibre, light received by said second optical light receiver, and, processing, with a light sensitive sensor, light transmitted by the third optical fibre to determine the torque.

13. The method according to claim 12, further comprising shaping the airgas by optical forks and converting the light received by the light sensitive sensor into electronic pulses that are transmitting to electronic pulse counter circuits where the information is stored and subsequently transmitted via duplex communication to a computer that based on the received signals calculates torque, angular velocity and the power developed in the shaft.

14. The method according to claim 12, further comprising using the light sensitive sensor for converting light into electronic pulses representing time between both rising and falling edges of the pulses respectively, thereby allowing the accumulation of twice a number of time delays for a number of shaft turns.

15. The method according to claim 12, further comprising accumulating both time between rising edges and time between falling edges for a predetermined number of shaft turns and then calculating a mean value of said time between the rising edges and the falling edges respectively to obtain an expression representing a shaft torsion when the angular velocity is known.

16. The method according to claim 12, wherein the first and second vanes have fingers extending along an outer periphery of each first and second vane.

* * * * *